United States Patent
Ichapurapu et al.

(10) Patent No.: US 11,621,992 B1
(45) Date of Patent: Apr. 4, 2023

(54) TECHNIQUES FOR SWITCHING COMMUNICATION CHANNELS

(71) Applicant: Amazon Technologies, Inc., Seattle, WA (US)

(72) Inventors: Ravi Ichapurapu, Morgan Hill, CA (US); Sameet Ramakrishnan, Saratoga, CA (US); Shao-Cheng Wang, Santa Clara, CA (US); Qinghai Gao, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 120 days.

(21) Appl. No.: 17/132,252

(22) Filed: Dec. 23, 2020

Related U.S. Application Data

(63) Continuation of application No. 16/532,183, filed on Aug. 5, 2019, now Pat. No. 10,880,356.

(51) Int. Cl.
  *H04L 65/80* (2022.01)
  *G06F 3/16* (2006.01)
  *H04W 36/06* (2009.01)

(52) U.S. Cl.
  CPC .............. *H04L 65/80* (2013.01); *G06F 3/165* (2013.01); *H04W 36/06* (2013.01)

(58) Field of Classification Search
  CPC ......... H04L 65/80; G06F 3/165; H04W 36/06
  See application file for complete search history.

(56) References Cited

U.S. PATENT DOCUMENTS

| | | | |
|---|---|---|---|
| 9,549,429 B1 | 1/2017 | Gudell et al. | |
| 10,075,548 B2 * | 9/2018 | Kim | H04W 12/04 |
| 2015/0326670 A1 | 11/2015 | Agerbak et al. | |
| 2016/0196097 A1 | 7/2016 | Gao et al. | |
| 2016/0262056 A1 | 9/2016 | Chen et al. | |
| 2018/0063758 A1 | 3/2018 | Velu | |
| 2018/0131771 A9 | 5/2018 | Kim et al. | |
| 2018/0300262 A1 | 10/2018 | Ellis et al. | |
| 2019/0347916 A1 | 11/2019 | Wild et al. | |
| 2019/0372838 A1 | 12/2019 | Travostino et al. | |
| 2019/0373430 A1 | 12/2019 | Srivatsa et al. | |

OTHER PUBLICATIONS

Office Action for U.S. Appl. No. 16/532,183, dated May 11, 2020, Ichapurapu, "Techniques for Switching Communication Channels", 11 Pages.

* cited by examiner

*Primary Examiner* — Keith Ferguson
(74) *Attorney, Agent, or Firm* — Lee & Hayes, P.C.

(57) ABSTRACT

This disclosure describes, in part, techniques for switching between communication channels in order to reduce latency of data transmissions. For instance, an electronic device may establish a first network connection with a network device and second network connection(s) with other electronic device(s). The electronic device may then send data received from the network device to the other electronic device(s). In some circumstances, the electronic device may establish a new network connection with the network device, such as on a different communication channel and/or use a different network band. In such circumstances, the electronic device may use one or more techniques to establish new network connections(s) with the other electronic device(s) in order to reduce the latency it takes to send the data received from the network device to the other electronic device(s).

20 Claims, 9 Drawing Sheets

400

○ 4A

↓

ESTABLISH, USING THE THIRD COMMUNICATION CHANNEL, A FOURTH NETWORK CONNECTION WITH THE AUDIO DEVICE
418

↓

RECEIVE, USING THE THIRD NETWORK CONNECTION, SECOND AUDIO DATA FROM THE NETWORK DEVICE
420

↓

SEND, USING THE FOURTH NETWORK CONNECTION, THE SECOND AUDIO DATA TO THE AUDIO DEVICE
422

↓

RECEIVE, USING THE THIRD NETWORK CONNECTION, SECOND VIDEO DATA FROM THE NETWORK DEVICE
424

↓

SEND THE SECOND VIDEO DATA TO THE DISPLAY DEVICE
426

TECHNIQUES FOR SWITCHING COMMUNICATION CHANNELS

RELATED APPLICATIONS

This application claims priority to and is a continuation of U.S. patent application Ser. No. 16/532,183, filed on Aug. 5, 2019, the entire contents of which are incorporated herein by reference.

BACKGROUND

An electronic device may be used to relay audio data sent from an access point to audio devices located within an environment. For instance, the electronic device may establish a network connection with the access point using a communication channel. The electronic device may then receive the audio data via the communication channel and send the audio data to the audio devices. In some instances, the audio data is to be synchronized with video being output by a display device, such as a television. As such, it is important to reduce the amount of latency that it takes for the electronic device to relay to the audio data to the audio devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-4B illustrate an example process for switching communication channels in order to reduce latency when communicating data, according to various examples of the present disclosure.

DETAILED DESCRIPTION

Figure 1:
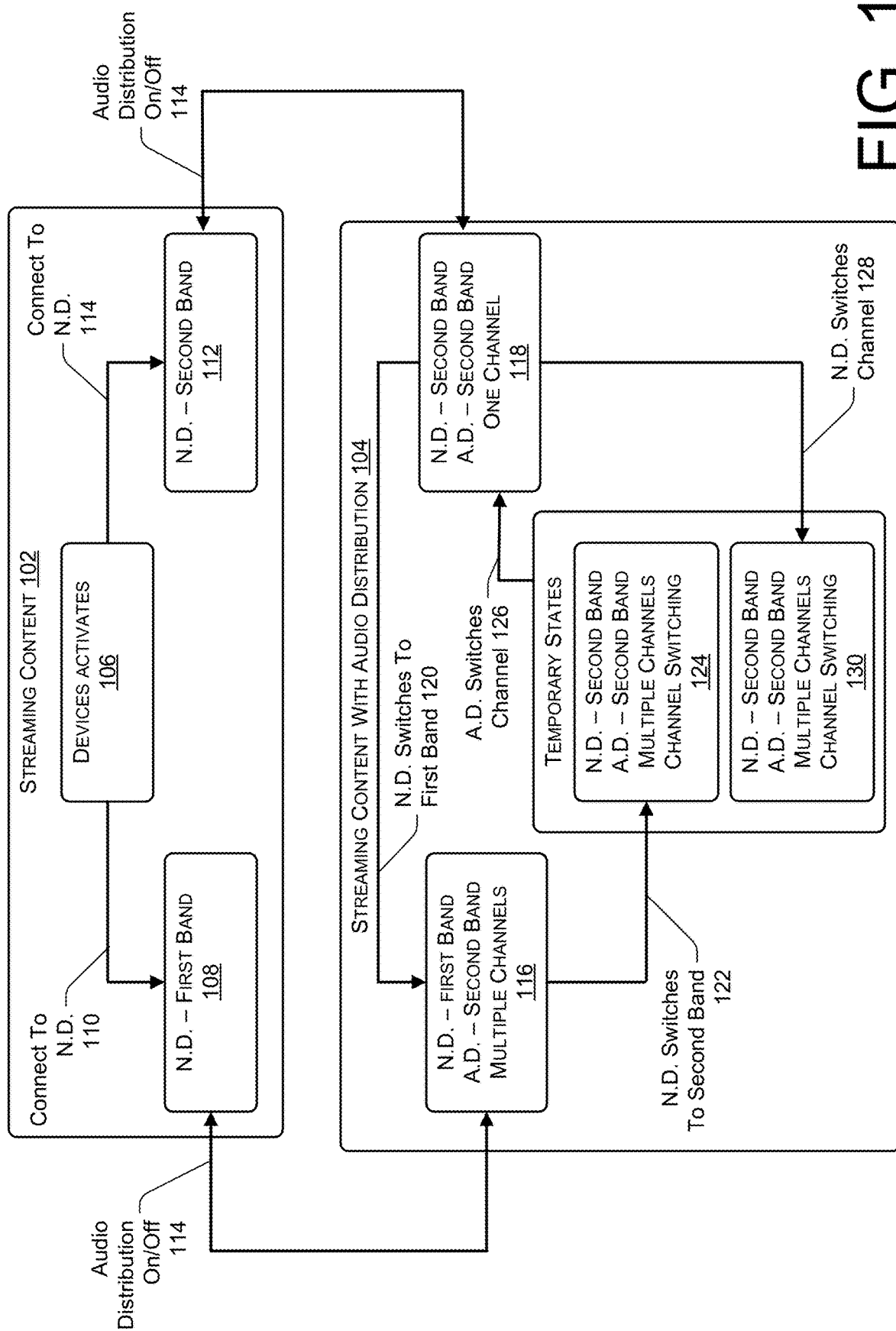
FIG. 1 illustrates a block diagram of example techniques for switching communication channels in order to reduce latency when sending data between devices, according to various examples of the present disclosure.

This disclosure describes, in part, techniques for switching communication channels in order to reduce latency when communicating data between devices. For instance, an electronic device may establish a first network connection with a network device, such as an access point, using a communication channel. The communication channel may be associated with a network band. As described herein, a network band may include, but is not limited to, a 2.4 gigahertz (G) band, a 4G band, a 4G band, a 5G band, and/or any other frequency of band. The electronic device may further establish second network connection(s) with other electronic device(s) using a communication channel. The communication channel may be associated with the network band or a second, different network band. In some instances, the communication channel used for the second network connection(s) is the same communication channel as the communication channel used for the first network connection. In other instances, the communication channel used for the second network connection(s) is a different communication channel than the communication channel used for the first network connection.

The electronic device may then relay data sent by the network device to the other electronic device(s). For example, the electronic device may receive the data using the first network connection. The electronic device may then send the data to the other electronic device(s) using the second network connection(s). In some instances, it may be important for the electronic device to reduce the latency it takes to relay the data sent by the network device to the other electronic device(s). For instance, if the data represents sound that is to be synchronized with content being displayed by a display device, then it may be important for the latency to be within a threshold latency for the synchronization. The threshold latency may include, but is not limited to, fifty milliseconds, one hundred milliseconds, one hundred and twenty milliseconds, two hundred milliseconds, and/or the like.

In some instances, the electronic device may need to establish a new network connection with the network device using a new communication channel. This may occur for many difference reasons, such as when the network device determines that the communication channel for the network connection is too congested, a user of the network device selects the new communication channel, and/or the like. This may also increase the latency associated with the electronic device relaying the data sent from the network device to the other electronic device(s). In order to reduce that latency, the electronic device may perform one or more techniques after switching to the new communication channel.

The selected technique may depend on the state of the network connections with the network device and the other electronic device(s). For instance, the electronic device may operate in multiple states when establishing the network connections with the network device and the other electronic device(s). For a first example, the electronic device may operate in a first state where the communication channel and the network band associated with the first network connection are different than the communication channel and the network band associated with the second network connection(s). In the first state, the network band associated with the second network connection(s) may include a greater frequency than the network band associated with the first network connection.

For a second example, the electronic device may operate in a second state where the communication channel and the network band associated with the first network connection are the same as the communication channel and the network band associated with the second network connection. In some instances, the second state may include two sub-states, such as a first sub-state that uses a first network band and a second sub-state that uses a second, greater network band. Still, for a third example, the electronic device may operate in a third state where the communication channel associated with the first network connection is different than the communication channel associated with the second network connection(s), however, the network band associated with the first network connection is the same as the network band associated with the second network connection(s).

In either of the examples above, the network device may use a single antenna and/or radio to communicate via a single stream with the electronic device or the network device may use multiple antennas and/or multiple radios to communicate via multiple streams with the electronic device. For a first example, while operating in the first state, the network device may communicate via multiple streams with the electronic device. For a second example, and again while operating in the first state, the network device may switch between communicating via single a stream and communication via multiple streams with the electronic device.

In some instances, and for latency reasons, it may be advantageous for the electronic device to operate in specific states. For example, it may be advantageous for the electronic device to operate in the first state, where (1) the communication channel and the network band associated with the first network connection are different than the communication channel and the network band associated with the second network connection(s) and (2) the network band associated with the second network connection(s) is greater than the network band associated with the first network connection. For another example, it may be advantageous for the electronic device to operate in the second sub-state of the second state, where the communication channel and the network band associated with the first network connection are the same as the communication channel and the network band associated with the second network connection(s). This may be because the average latency for sending data while operating in those specific states may be less than the average latency for sending data while operating in the other states. The average latency may include the latency over a given period of time (e.g., ten seconds, fifth seconds, one minute, etc.).

As such, when the electronic device switches to the new communication channel, the electronic device may perform one or more techniques to operate in the first state or the second sub-state of the second state. For a first example, the electronic device may be operating in the first mode where a first communication channel and a first network band associated with the first network connection are different than a second communication channel and a second network band associated with the second network connection(s). In this example, the second network band may include a greater frequency than the first network band. The electronic device may then determine to switch the first network connection to a third network connection, where the third network connection is associated with a third communication channel and the third communication channel is associated with the second network band. In some instances, the electronic device makes the determination based at least in part on receiving, from the network device and using the first network connection, data representing a request to change to the third communication channel.

Based at least in part on the determination, the electronic device may terminate the first network connection with the network device and/or establish the third network connection with the network device using the third communication channel. After establishing the third network connection, the electronic device may be operating in a "temporary" state. In some instances, the state may be considered "temporary" since the electronic device attempts to switch to a new state, with less latency, within a threshold period of time to when the electronic device began operating in the "temporary" state. For instance, while operating in the "temporary" state, the electronic device may determine to establish fourth network connection(s) with the other electronic device(s) using the third communication channel. As such, the electronic device may terminate the second network connection(s) with the other electronic device(s) and/or establish the fourth network connection(s) with the other electronic device(s) using the third communication channel. After establishing the fourth network connection(s), the electronic device may be operating in the second sub-state of the second state.

For a second example, the electronic device may be operating in the second sub-state of the second state where a first communication channel and a first network band associated with the first network connection are the same as the first communication channel and the first network band associated with the second network connection(s). The electronic device may then determine to switch the first network connection to a third network connection, where the third network connection is associated with a second communication channel and the second communication channel is associated with a second network band. In some instances, the electronic device makes the determination based at least in part on receiving, from the network device and using the first network connection, data representing a request to change to the second communication channel.

Based at least in part on the determination, the electronic device may terminate the first network connection with the network device and/or establish the third network connection with the network device using the second communication channel. Additionally, the electronic device may determine to continue communicating with the other electronic device(s) using the second network connection(s). This is because the electronic device is now operating in the first state.

For a third example, the electronic device may again be operating in the second sub-state of the second state where a first communication channel and a network band associated with the first network connection are the same as the first communication channel and the network band associated with the second network connection(s). The electronic device may then determine to switch the first network connection to a third network connection, where the third network connection is associated with a second communication channel and the second communication channel is also associated with the network band. In some instances, the electronic device makes the determination based at least in part on receiving, from the network device and using the first network connection, data representing a request to change to the second communication channel.

Based at least in part on the determination, the electronic device may terminate the first network connection with the network device and/or establish the third network connection with the network device using the second communication channel. After establishing the third network connection, the electronic device may be operating in a "temporary" state since second communication channel is different than the first communication channel. While operating in the "temporary" state, the electronic device may determine to establish fourth network connection(s) with the other electronic device(s) using the second communication channel. As such, the electronic device may terminate the second network connection(s) with the other electronic device(s) and/or establish the fourth network connection(s) with the other electronic device(s) using the second communication channel. After establishing the fourth network connection(s), the electronic device may again be operating in the second sub-state of the second state.

By performing the techniques described above to switch to specific operating states, the electronic device is able to reduce the latency it takes to relay the data sent from the network device to the other electronic device(s). The techniques may provide the improved latency when the electronic device includes a single radio for sending and receiving data and/or when the electronic device includes multiple radios for sending and receiving data. Additionally, the reduced latency may be beneficial in may circumstances, such as when the data includes audio data that is being synchronized with video data being output by a display device.

For example, the other electronic device(s) may include audio device(s) that are outputting sound that is synchronized with content being presented by the display device. In such an example, the electronic device may be relaying audio data received from the network device to the audio devices. Additionally, in some instances, the electronic device may be relaying video data sent by the network device to the display device. The electronic device may send the video data to the network device using a wired connection, such as a cable connection, an Ethernet connection, and/or another type of wired connection, and/or the electronic device may send the video data to the network device using a wireless connection, which are described herein.

In some instances, the electronic device may perform one or more techniques to synchronize the sound being output by the audio device(s) with the content being displayed by the display device. For instance, the electronic device may receive first timestamp data representing a first timestamp associated with the audio data being sent to the audio device(s) and/or second timestamp data representing a second timestamp associated with the video data being sent to the display device. In some instances, the electronic device receives, from the network device, a data packet that includes at least the video data, the audio data, the first timestamp data, and the second timestamp data. In some instances, the electronic device separately receives, from the network device, the video data, the audio data, the first timestamp data, and/or the second timestamp data. Still, in some instances, the electronic device receives, from the network device, a first data packet that the includes the audio data and the first timestamp data and a second data packet that includes the video data and the second timestamp data.

The electronic device may then use the first timestamp data and the second timestamp data to synchronize the outputting of the sound with the displaying of the content. For a first example, the electronic device may send, to the audio device(s), the audio data and the first timestamp data (e.g., from the data packet). The first timestamp data may include a first instruction to output the sound at a first time represented by the first timestamp. Additionally, the electronic device may send, to the display device, the video data and the second timestamp data (e.g., from the data packet). The second timestamp data may include a second instruction to display the content at a second time represented by the second timestamp. In some instances, the first time is the same as the second time. In other instances, the first time is within a threshold period of time to the second time. As described herein, a threshold period of time may include, but is not limited to, one millisecond, five milliseconds, ten milliseconds, one hundred milliseconds, and/or another time period.

For a second example, the electronic device may use the first timestamp data to determine when to send the audio data to the audio device(s) and/or use the second timestamp data to determine when to send the video data to the display device. For instance, the electronic device may determine that a current time includes the first time represented by the first timestamp data and/or that the current time is within a threshold period of time to the first time. Based at least in part on the determination, the electronic device may send, to the audio device(s), the audio data for output by the audio device(s). Additionally, the electronic device may determine that the current time includes the second time represented by the second timestamp data and/or that the current time is within a threshold period of time to the second time. Based at least in part on the determination, the electronic device may send, to the display device, the video data for output by the display device.

While synchronizing the outputting of the audio with the displaying of the content, the electronic device may perform one or more of the techniques described above to reduce the latency associated with relaying the audio data to the audio device(s) and the video data to the display device. Additionally, the electronic device may continuously be sending the audio data to the audio device(s) even when performing the one or more techniques. For example, the electronic device may receive and then send first audio data while operating in an initial state, receive and then send second audio data while operating in a temporary state, and receive and send third audio data while operating in a new state. Additionally, the electronic device may continuously be sending the video data to the display device while performing the one or more techniques.

As described herein, an electronic device (including the network device) may include, but is not limited to, a dongle, a tablet, a mobile phone, a laptop, an audio receiver, a voice-activated device, an access point, a speaker, a peripheral device that connects to another electronic device, and/or any other type of device. Additionally, a display device may include, but is not limited to, a television, a projector, a monitor, a tablet, a mobile phone, a peripheral device that connects to another display device, and/or any other type of device that is capable of displaying content (e.g., image(s), videos, etc.) and/or capable of causing another device to display content.

Additionally, the electronic device may include one or more components (e.g., hardware components) that function to cause the electronic device to establish new connections when the electronic device starts operating in a "temporary" state. For example, the electronic device may include a host processor that manages the network connections of the electronic device. When the electronic device enters the "temporary" state by switching the network connection with the network device, a chip (e.g., a Wi-Fi chip) of the electronic device may send a request to the host processor to switch the network connection(s) with the other electronic device(s). In response, the host processor may cause the network connection(s) with the other electronic device(s) to be established.

FIG. 1 illustrates a block diagram of example techniques for switching communication channels in order to reduce latency when sending data between devices, according to various examples of the present disclosure. In the example of FIG. 1, an electronic device may operate in a state 102 where the electronic device is streaming content or in a state 104 where the electronic device is streaming content with audio distribution. For instance, in the state 102, the electronic device may be receiving video data from a network device (N.D. in FIG. 1) and sending the video data to a display device. Additionally, while in the state 104, the electronic device may be receiving the video data and audio data from the network device. The electronic device may then be sending the video data to the display device and the audio data to audio device(s) (A.D. in FIG. 1).

To begin, the electronic device may enter a state 106 where the electronic device is activated. For instance, a user of the electronic device may turn on the electronic device. After activating, the electronic device may either operate a state 108 where the electronic device establishes a first network connection with the network device 110 using a first communication channel associated with a first network band or operate a state 112 where the electronic device establishes a second network connection with the network device using a second communication channel associated with a second network band. In the example of FIG. 1, the second network band may include a greater frequency than the first network band. For example, the first network band may include a 2.4G band and the second network band may include a 5G band. However, this is just one example of the first network band and the second network band.

In some instances, the electronic device stores data representing configuration settings of the network device. The configuration settings may include, but are not limited to, an identifier (service set identifier (SSID)) associated with the network device, a password associated with the network device, a preferred network band to use when connecting to the network device, a preferred communication channel to use when connecting to the network device, and/or other settings for connecting to the network device. The electronic device may then use the configuration settings to identify and connect to the first communication channel associated with the first network band or the second communication channel associated with the second network band. For example, after activating, the electronic device may use the configuration settings to identify a communication channel that is associated with the identifier. The electronic device may then establish the connection using the communication channel.

The electronic device may then determine to turn on the audio distribution 114 with the audio device(s). In some instances, the electronic device makes the determination based at least in part on receiving input associated with turning on the audio distribution. In some instances, the electronic device automatically turns on the audio distribution. In either instance, the electronic device may operate in a different state based at least in part on whether the electronic device is connected to the network device using the first communication channel associated with the first network band (e.g., the state 108) or if the electronic device is connected to the network device using the second communication channel associated with the second network band (e.g., the state 112).

For instance, and as shown in the example of FIG. 1, if the electronic device is operating in the state 108, the electronic device may switch to operating in a state 116 where the electronic device maintains the first network connection with the network device using the first communication channel. Additionally, the electronic device may establish third network connection(s) with the audio device(s) using a third communication channel associated with the second network band. While operating in the state 116, the electronic device may be receiving video data and audio data from the network device using the first network connection. The electronic device may then send the video data to display device using a wired and/or wireless connection and send the audio data to the audio device(s) using the third network connection(s).

Alternatively, if the electronic device is operating in the state 112, the electronic device may switch to operating in a state 118 where the electronic device maintains the second network connection with the network device using the second communication channel. Additionally, the electronic device may establish fourth network connection(s) with the audio device(s) using the second communication channel. While operating in the state 118, the electronic device may be receiving video data and audio data from the network device using the second network connection (e.g., the second communication channel). The electronic device may then send the video data to display device using the wired and/or wireless connection and send the audio data to the audio device(s) using the fourth network connection(s) (e.g., the second communication channel).

In the example of FIG. 1, the electronic device may then switch the network connection (e.g., the first network connection or the second network connection) with the network device. In some instances, the electronic device switches the network connection based at least in part on receiving, from the network device, data indicating at least a new communication channel for connecting to the network device. In some instances, the electronic device switches the network connection based at least in part on the network connection with the network device being terminated. In either instance, the electronic device may perform one or more techniques in order to reduce the latency of sending the audio data to the audio device(s) when changing states.

For a first example, and if the electronic device is operating in the state 118, the electronic device may determine to switch to a fourth communication channel (which may be the same as the first communication channel or may be different than the first communication channel) associated with the first band 120. In such an example, the electronic device may terminate the second network connection with the network device and/or establish a fifth network connection with the network device using the fourth communication channel. Additionally, the electronic device may maintain the fourth network connection(s) with the audio device(s). In other words, the electronic device may switch from operating in the state 118 to operating in the state 116. While operating in the state 116, the electronic device may be receiving video data and audio data from the network device using the fifth network connection. The electronic device may then send the video data to display device using the wired and/or wireless connection and send the audio data to the audio device(s) using the fourth network connection(s).

For a second example, and if the electronic device is operating in the state 116, the electronic device may determine to switch to a fifth communication channel (which may be the same as the second communication channel or may be different than the second communication channel) associated with the second network band 122. In such an example, the electronic device may begin operating in a first temporary state 124 by terminating the first network connection with network device and/or establishing a sixth network connection with the network device using the fifth communication channel. The electronic device may also maintain the third network connection(s) with the audio device(s). While operating in the first temporary state 124, the electronic device may be receiving video data and audio data from the network device using the sixth network connection. The electronic device may then send the video data to display device using the wired and/or wireless connection and send the audio data to the audio device(s) using the third network connection(s). In other words, the electronic device may switch between the third communication channel and the fifth communication channel associated with the second network band while operating in the first temporary state 124, which may increase latency.

While operating in the first temporary state 124, the electronic device may then determine to switch to the state 118 by switching the audio device(s) to the fifth communication channel. For instance, the electronic device may maintain the sixth network connection with the network device. Additionally, the electronic device may terminate the third network connection(s) with the audio device(s) and/or establish seventh network connection(s) with the audio device(s) using the fifth communication channel. While again operating in the state 118, the electronic device may be receiving video data and audio data from the network device using the sixth network connection (e.g., using the fifth communication channel). The electronic device may then send the video data to display device using the wired and/or wireless connection and send the audio data to the audio device(s) using the seventh network connection(s) (e.g., also using the fifth communication channel).

For a third example, and if the electronic device is again operating in the state 118, the electronic device may determine to switch the connection with the network device to a sixth communication channel associated with the second band 128. In such an example, the electronic device may begin operating in a second temporary state 130 by terminating the second network connection with network device and/or establishing an eighth network connection with the network device using the sixth communication channel. The electronic device may also maintain the fourth network connection(s) with the audio device(s). While operating in the second temporary state 130, the electronic device may be receiving video data and audio data from the network device using the eighth network connection. The electronic device may then send the video data to display device using the wired and/or wireless connection and send the audio data to the audio device(s) using the fourth network connection(s). In other words, the electronic device may switch between the second communication channel and the sixth communication channel associated with the second network band while operating in the second temporary state 130, which may increase latency.

While operating in the second temporary state 130, the electronic device may then determine to switch back to the state 118 by switching the audio device(s) to the sixth communication channel. For instance, the electronic device may maintain the eighth network connection with the network device. Additionally, the electronic device may terminate the fourth network connection(s) with the audio device(s) and/or establish ninth network connection(s) with the audio device(s) using the sixth communication channel. While again operating in the state 118, the electronic device may be receiving video data and audio data from the network device using the eighth network connection (e.g., using the sixth communication channel). The electronic device may then send the video data to display device using the wired and/or wireless connection and send the audio data to the audio device(s) using the ninth network connection(s) (e.g., also using the sixth communication channel).

In some instances, the electronic device may continue to perform these techniques in order to operate in the state 116 or the state 118 to reduce latency when relaying the video data and the audio data. The electronic device may continue to perform these techniques until the audio distribution is turned off 114. If the electronic device is operating in the state 116 when the audio distribution is turned off 114, then the electronic device may switch back to operating in the state 108. However, if the electronic device is operating in the state 118 when the audio distribution is turned off 114, then the electronic device may switch back to operating in the state 112.

In some instances, the electronic device may receive input requesting that the audio distribution be turned off. In such instances, the electronic device may again just start streamlining content 102. For a first example, if the electronic device is operating the state 116, and based at least in part on the request, the electronic device may terminate the network connection(s) with the audio device(s) in order to again operate in the state 108. For a first example, if the electronic device is operating the state 118, and based at least in part on the request, the electronic device may terminate the network connection(s) with the audio device(s) in order to again operate in the state 112

While the example of FIG. 1 describes the electronic device establishing network connections with the audio device(s) and/or receiving and sending the audio data, in other example, the electronic device may perform the techniques of FIG. 1 to establish network connections with other types of devices and/or to receive and send other types of data.

Figure 2:
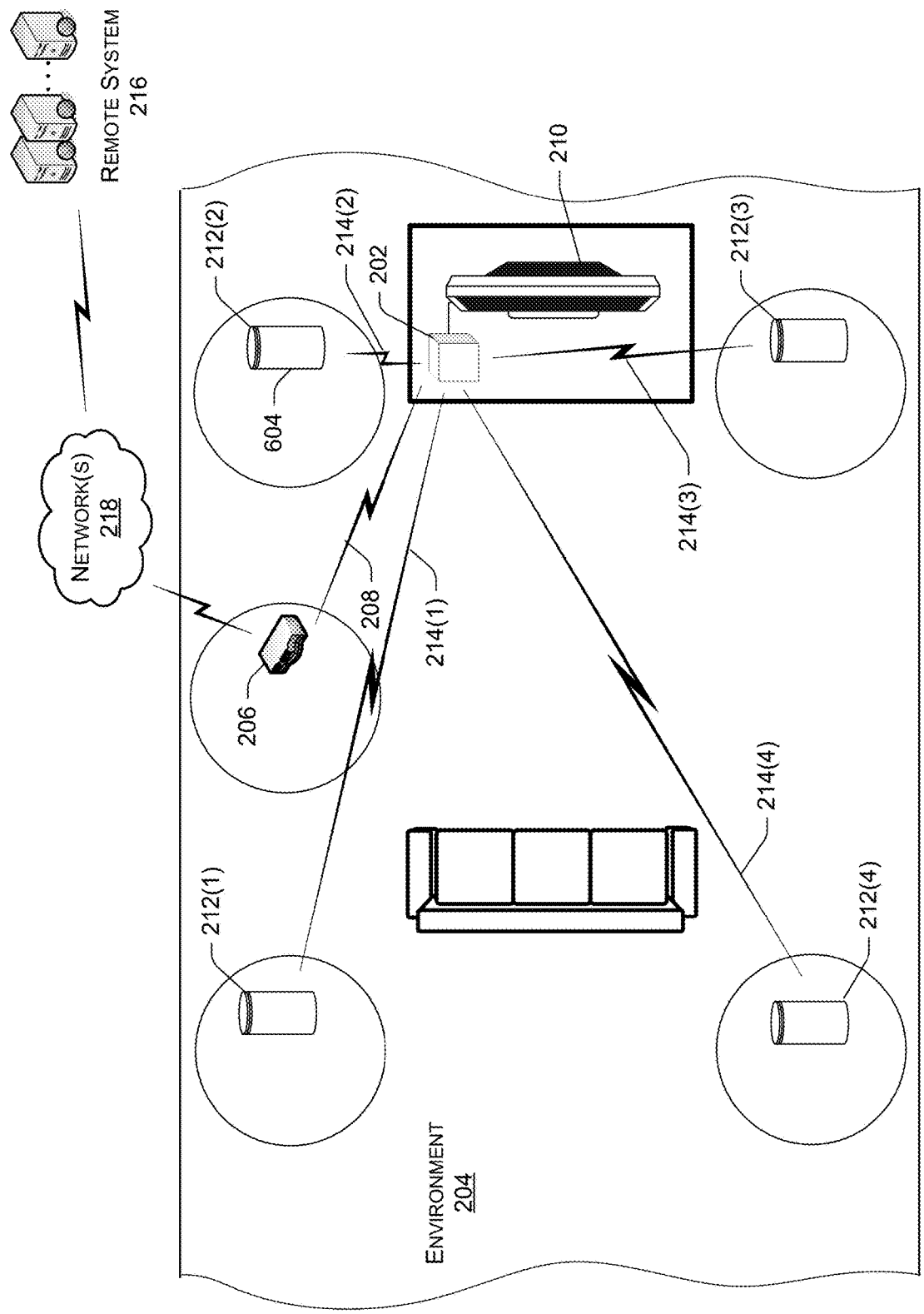
FIG. 2 illustrates a block diagram of an example system that uses techniques for switching communication channels in order to reduce latency when sending data between devices, according to various examples of the present disclosure.

FIG. 2 illustrates a block diagram of an example system that uses techniques for switching communication channels in order to reduce latency when sending data between devices, according to various examples of the present disclosure. As shown, an electronic device 202 located in an environment 204 may establish first network connection with a network device 206, which is illustrated by 208. Additionally, the electronic device 202 may establish a second network connection with a display device 210. The second network connection with the display device 210 may include a wired connection and/or the network connection may include a wireless connection. Furthermore, the electronic device 202 may establish third network connections with audio devices 212(1)-(4) located around the environment 204, which are illustrated by 214(1)-(4). While four audio devices 212(1)-(4) are illustrated in the example of FIG. 2, in other examples, the electronic device 202 may establish network connection(s) with any number of audio device(s).

In the example of FIG. 2, a remote system 216 may be sending data to the network device 206 via network(s) 218. In some instances, the data may include video data, audio data, and timestamp data for synchronizing the audio data with the video data. In such instances, the remote system 216 may send a data packet to the network device 206, where the data packet includes the video data, the audio data, and/or the timestamp data. In other instances, the remote system 216 may separately send the video data, the audio data, and/or the timestamp data to the network device 206. In either instance, the network device 206 may then send, using the first network connection, the video data, the audio data, and/or the timestamp data to the electronic device 202.

The electronic device 202 may then send, using the second network connection, the video data, the audio data, and/or the timestamp data to the display device 210. After receiving the data, the display device 210 may present content represented by the video data. In some instances, the display device 210 may further output sound represented by the audio data. Additionally, the electronic device 202 may send, using the third network connections, the audio data and/or the timestamp data to the audio devices 212(1)-(4). In some instances, the electronic device 202 sends the same audio data and/or the same timestamp data to all of the audio devices 212(1)-(4). In other instances, the electronic device 202 sends different audio data and/or different timestamp data to one or more of the audio device 212(1)-(4). In either instance, the audio devices 212(1)-(4) may then output sound represented by the audio data.

Additionally, in the example of FIG. 2, the electronic device 202 may perform one or more of the techniques described herein to reduce latency when establishing new network connections with the network device 206. For instance, the electronic device 202 may perform the techniques described in FIG. 1 in order to transition between different states. This may reduce the amount of latency it takes to send the audio data to the audio device 212(1)-(4). By reducing the amount of latency, the sound being output by the audio devices 212(1)-(4) may be better synchronized with the content being presented by the display device 210.

Figure 3:
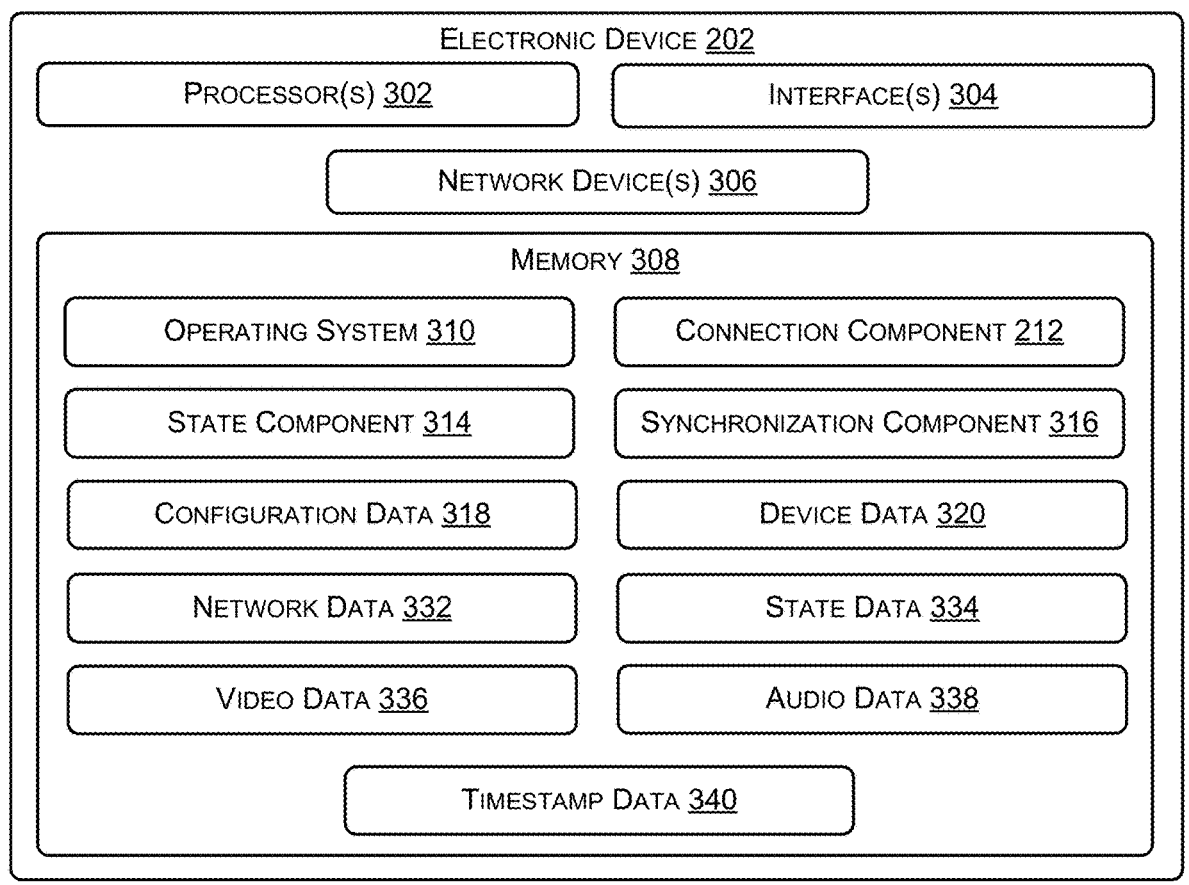
FIG. 3 illustrates a block diagram of an example architecture of an electronic device, according to various examples of the present disclosure.

FIG. 3 illustrates a block diagram of an example architecture of the electronic device 202, according to various examples of the present disclosure. As shown, the electronic device 202 includes processor(s) 302, network interface(s) 304, network device(s) 306, and memory 308. In some instances, the electronic device 202 may include one or more additional components not illustrated in the example of FIG. 3. For example, the electronic device may include speaker(s), microphone(s), light(s), output device(s), internal power source(s), and/or the like. Additionally, or alternatively, in some instances, the electronic device 202 may not include one or more of the components illustrated in the example of FIG. 3.

The network device(s) 306 may include cable(s), wire(s), and/or other hardware components that the electronic device 202 uses to connect to the network device 206, the display device 210, and/or another device. For example, the network device(s) 306 may include an Ethernet cable that the electronic device 202 uses to connect to the display device 210. While this is just one example of a hardware component that the electronic device 202 may use to connect to the display device 210, in other examples, the electronic device 202 may use one or more additional or alternatively hardware components to connect to the display device 210.

The electronic device 202 may include the memory 308. The memory 308 may be used to store any number of software components that are executable by the processor(s) 302. Software components stored in the memory 308 may include an operating system 310 that is configured to manage hardware and services within and coupled to the electronic device 202. In addition, executable components stored by the memory 308 may include a connection component 312, a state component 314, and a synchronization component 316. In some instances, the electronic device 202 may not include one or more of the connection component 312, the state component 314, or the synchronization component 316. Additionally, or alternatively, in some instances, the electronic device 202 may include one or more additional components.

The connection component 312 may be configured to establish connections with other devices. For example, when the electronic device 202 is activated (e.g., turned on, powered, etc.), the connection component 312 may cause the network interface(s) 304 to establish a network connection with the network device 206. In some instances, to establish the connection, the connection component 312 uses configuration data 318. The configuration data 318 may include, but is not limited to, an identifier (SSID) associated with the network device 206, a password associated with the network device 206, a preferred network band when connecting to the network device 206, a preferred communication channel when connecting to the network device 206, and/or other settings for connecting to the network device 206. In some instances, the electronic device 202 receives the configuration data 318 during a configuration process of the electronic device 202. In some instances, the configuration data 318 may be updated.

The connection component 312 may further cause the network interface(s) 304 to establish network connection(s) with one or more other devices, such as the audio device(s) 212(1)-(4). In some instances, the connection component 312 establishes the network connection(s) with the one or more other devices in response to determining that audio distribution has been activated (e.g., turned on). In some instances, to establish the network connection(s) with the one or more other devices, the electronic device 202 uses device data 320 associated with the one or more other devices. For example, the device data 330 may represent at least an identifier associated with the device. The identifier may include, but is not limited to, a media access control (MAC) address, a numerical identifier, an alphabetic identifier, a mixed numeric and alphabetic identifier, and/or any other type of identifier that the electronic device 202 may use to identify the device.

In some instances, the connection component 312 may further be configured to terminate connections with other devices. For a first example, if the electronic device 202 receives, from the network device 206, network data 332 representing an instruction and/or a request to establish a new network connection using a new communication channel, the connection component 312 may cause the network interface(s) 304 to terminate the network connection with the network device 206. The connection component 312 may then cause the network interface(s) 304 to establish the new network connection with the network device 206 using the new communication channel.

For a second example, after establishing the new network connection with the network device 206, the electronic device (e.g., the state component 314) may determine to establish new network connection(s) with the one or more other devices. As such, the connection component 312 may cause the network interface(s) 304 to terminate the network connection(s) with the one or more other devices. The connection component 312 may then cause the network interface(s) 304 to establish the new network connection(s) with the one or more other devices.

The state component 314 may be configured to cause the electronic device 202 to operate in one or more states, which are represented by the state data 334. For instance, and as discussed herein, the electronic device 202 may operate in multiple states when establishing the network connections with the network device 206 and the one or more other devices. For a first example, the electronic device 202 may operate in a state where a communication channel and a network band associated with a first network connection with the network device 206 are different than a communication channel and a network band associated with second network connection(s) with the one or more other devices. In this state, the network band associated with the second network connection(s) may include a greater frequency than the network band associated with the first network connection (which may be similar to the state 116 in the example of FIG. 1).

For a second example, the electronic device 202 may operate in a state where a communication channel and a network band associated with a first network connection with the network device 206 are the same as a communication channel and a network band associated with second network connection(s) with the one or more other devices. In some instances, this state may include two sub-states, such as a first sub-state that uses a first network band and a second sub-state that uses a second, greater network band (which may be similar to the state 118 in the example of FIG. 1).

Still, for a third example, the electronic device 202 may operate in a state where a communication channel associated with a first network connection with the network device 206 is different than a communication channel associated with second network connection(s) with the one or more other devices, however, a network band associated with the first network connection is the same as a network band associated with the second network connection(s) (which may be similar to the temporary state 124 or the temporary state 130 from the example of FIG. 1). In this state, the electronic device 202 may switch between the communication channels when sending and receiving data.

In some instances, to cause the electronic device 202 to operate in a state, the state component 314 may determine a communication channel and/or a network band associated with a network connection with the network device 206. The state component 314 may then select a communication channel and a network band for establishing network connection(s) with the one or more other devices, where the selections are based at least in part on the communication channel and the network band of associated with the network connection with the network device 206. In some instances, the state component 314 selects the communication channel and the network band for establishing the network connection(s) with the one or more other devices such that the electronic device is operating in the state 116 or the state 118 from the example of FIG. 1.

For a first example, the electronic device 202 may be configured to establish a first network connection with the network device 206 using a first network band or a second network band, where the second network band includes a greater frequency than the first network band. In this first example, the first network connection may be associated with a first communication channel on the first network band. As such, the state component 314 may select a second communication channel on the second network band for establishing second network connection(s) with the one or more other devices.

For a second example, the electronic device 202 may again be configured to establish a first network connection with the network device 206 using a first network band or a second network band, where the second network band includes a greater frequency than the first network band. In this second example, the first network connection may be associated with a communication channel on the second network band. As such, the state component 314 may select the communication channel on the second network band for establishing second network connection(s) with the one or more other devices.

In some instances, the state component 314 may further be configured to perform one or more of the techniques described herein for establishing new network connection(s) with the one or more other devices when the electronic device 202 establishes a new network connection with the network device 206. For example, the state component 314 may be configured to perform one or more of the techniques described with respect to the example of FIG. 1. In some instances, by performing the one or more techniques, the electronic device 202 is configured to reduce the latency associated with relaying data sent from the network device 206 to the one or more other devices.

The synchronization component 316 may be configured to synchronize data being sent to one or more first devices with data being sent to one or more second devices. For example, and using the example environment 204 of FIG. 2, the electronic device 202 may receive, using a network connection with the network device 206, video data 336, audio data 338, and/or timestamp data 340 from the network device 206. The synchronization component 316 may then be configured cause the electronic device 202 to send the video data 336 and/or the timestamp data 340 to the display device 210 (e.g., using the network device(s) 306 or the network interface(s) 304). Additionally, the synchronization component 316 may be configured to cause the electronic device 202 to send the audio data 338 and/or the timestamp data 340 to the audio devices 212(1)-(4) using network connection(s) with the audio device(s) 212(1)-(4). In some instances, the synchronization component 316 uses the timestamp data 340 when sending the video data 336 and/or the audio data 338.

In the example of FIG. 3, the electronic device 202 further includes the processor(s) 302, the network interface(s) 304, and the memory 308. As used herein, a processor, such as the processor(s) 302, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 308, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 304, may enable data to be sent between devices. For example, the network interface(s) 304 may enable data to be sent between the electronic device 202, the network device 206, the display device 210, the audio device(s) 212(1)-(4), and/or with one or more other remote systems, as well as other networked devices. The network interface(s) may include one or more network interface controllers (NICs) or other types of transceiver devices to send and receive data over network(s), such as the network(s) 218.

For a first example, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network. For a second example, the network interface(s) may allow the electronic device 202 to communicate using Bluetooth, ZigBee, Z-Wave, a low-power wide-area network (LPWAN), and/or the like.

FIGS. 4A-8 illustrate various processes for switching communication channels in order to reduce latency when communicating data between devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 4A:
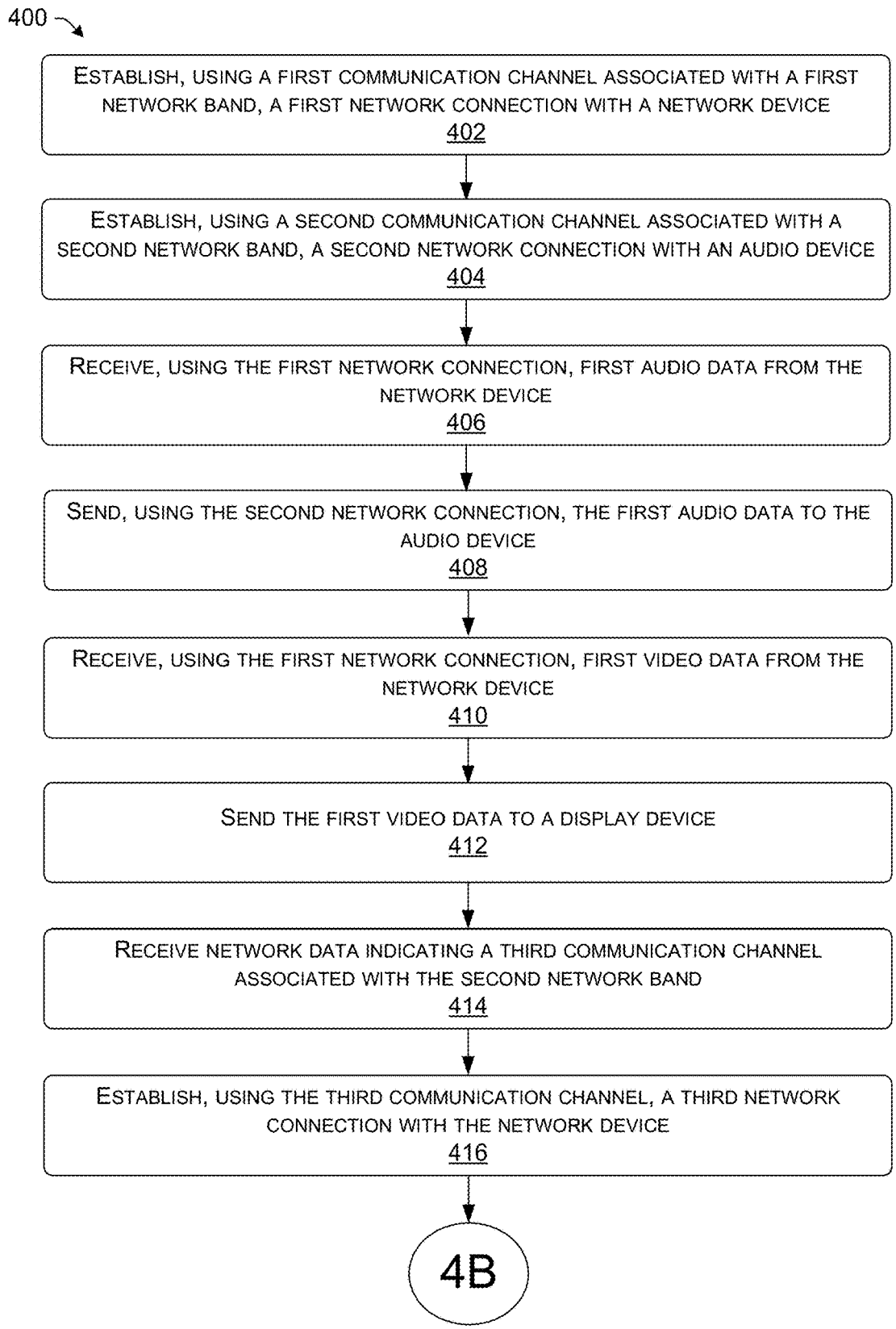

FIGS. 4A-4B illustrate an example process 400 for switching communication channels in order to reduce latency when communicating data, according to various examples of the present disclosure. At 402, the process 400 may include establishing, using a first communication channel associated with a first network band, a first network connection with a network device. For instance, the electronic device 202 may establish the first network connection with the network device 206. The electronic device 202 may establish the first network connection using the first communication channel associated with the first network band. In some instances, the electronic device 202 establishes the first network connection after being activated.

At 404, the process 400 may include establishing, using a second communication channel associated with a second network band, a second network connection with an audio device. For instance, the electronic device 202 may establish the second network connection with at least the audio device 212(1). The electronic device 202 may establish the second network connection using the second communication channel associated with the second network band. In some instances, second network band includes a greater frequency than the first network band. In some instances, the electronic device 202 establishes the second network connection after a distribution mode of the electronic device 202 is activated.

At 406, the process 400 may include receiving, using the first network connection, first audio data from the network device and at 408, the process 400 may include sending, using the second network connection, the first audio data to the audio device. For instance, the electronic device 202 may receive the first audio data from the network device 206 using the first network connection. In some instances, the electronic device 202 further receives, using the first network connection and from the network device 206, first timestamp data associated with the first audio data. The electronic device 202 may then send, using the second network connection, the first audio data and/or the first timestamp data to the audio device 212(1).

At 410, the process 400 may include receiving, using the first network connection, first video data from the network device and at 412, the process 400 may include sending the first video data to a display device. For instance, the electronic device 202 may receive the first video data from the network device 206 using the first network connection. In some instances, the electronic device 202 further receives, using the first network connection and from the network device 206, second timestamp data associated with the first video data. The electronic device 202 may then send the first video data and/or the second timestamp data to the display device 210.

At 414, the process 400 may include receiving network data indicating a third communication channel associated with the second network band. For instance, the electronic device 202 may receive the network data. In some instances, the electronic device 202 receives the network data from the network device 206 using the first network connection. In some instances, the network data includes an instruction to establish a new network connection using the third communication channel.

At 416, the process 400 may include establishing, using the third communication channel, a third network connection with the network device. For instance, based at least in part on receiving the network data, the electronic device 202 may terminate the first network connection with the network device 206. The electronic device 202 may then establish the third network connection with the network device 206. In some instances, after establishing the third network connection, the electronic device 202 may be operating in a "temporary" state.

At 418, the process 400 may include establishing, using the third communication channel, a fourth network connection with the audio device. For instance, based at least in part on entering the "temporary" state, the electronic device 202 may determine to establish the fourth network connection with the audio device 212(1) using the third communication channel. This may be to reduce latency when relaying data sent from the network device 206 to the audio device 212(1). As such, the electronic device 202 may terminate the second network connection with the audio device 212(1). The electronic device 202 may then establish the fourth network connection with the audio device 212(1).

At 420, the process 400 may include receiving, using the third network connection, second audio data from the network device and at 422, the process 400 may include sending, using the fourth network connection, the second audio data to the audio device. For instance, the electronic device 202 may receive the second audio data from the network device 206 using the third network connection. In some instances, the electronic device 202 further receives, using the third network connection and from the network device 206, third timestamp data associated with the second audio data. The electronic device 202 may then send, using the fourth network connection, the second audio data and/or the third timestamp data to the audio device 212(1).

At 424, the process 400 may include receiving, using the third network connection, second video data from the network device and at 426, the process 400 may include sending the second video data to the display device. For instance, the electronic device 202 may receive the second video data from the network device 206 using the third network connection. In some instances, the electronic device 202 further receives, using the third network connection and from the network device 206, fourth timestamp data associated with the second video data. The electronic device 202 may then send the second video data and/or the fourth timestamp data to the display device 210.

Figure 5:
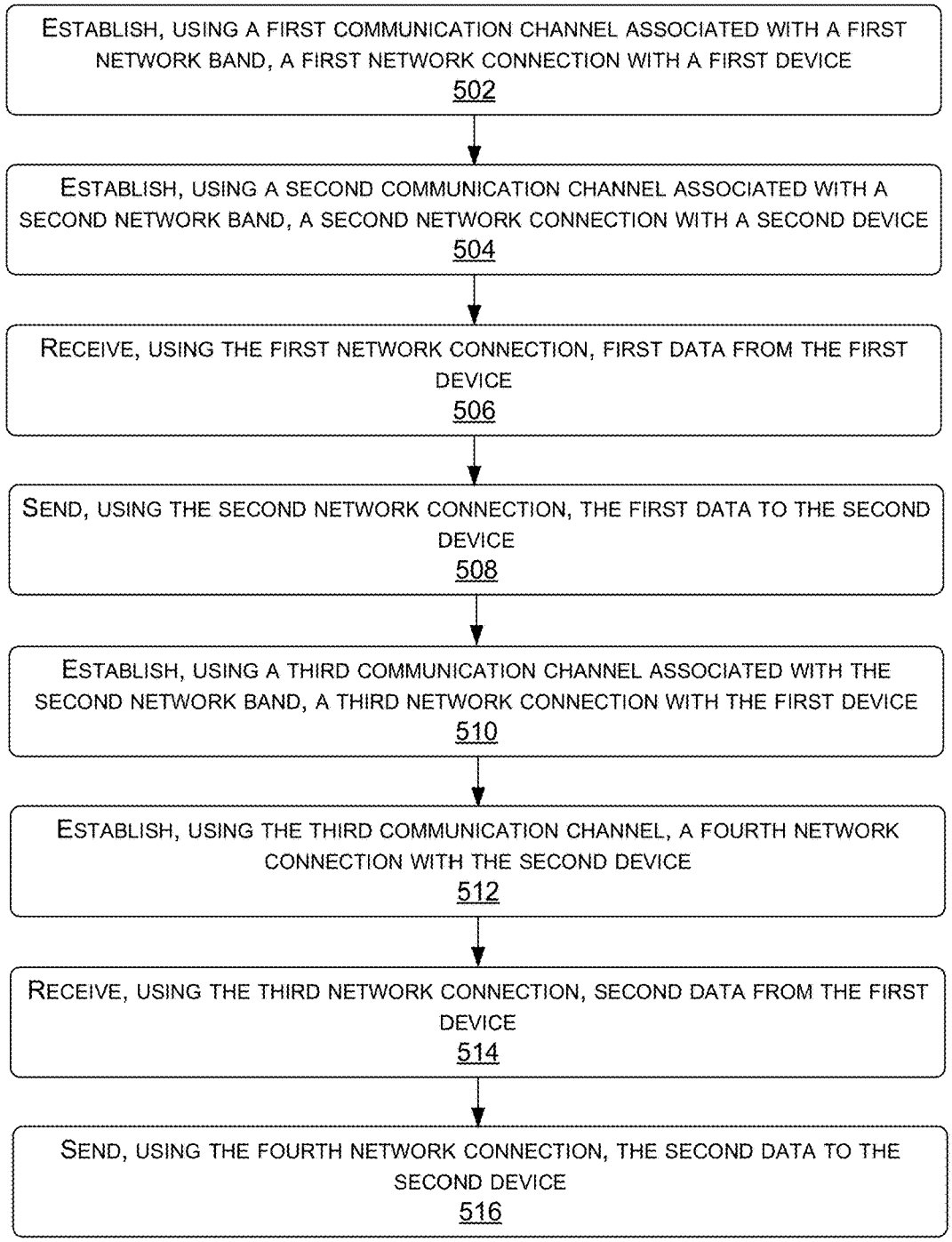
FIG. 5 illustrates a first example process for switching between operational states when a network device switches communication channels, according to various examples of the present disclosure.

FIG. 5 illustrates a first example process 500 for switching between operational states when a network device switches communication channels, according to various examples of the present disclosure. At 502, the process 500 may include establishing, using a first communication channel associated with a first network band, a first network connection with a first device. For instance, the electronic device 202 may establish the first network connection with the first device. The electronic device 202 may establish the first network connection using the first communication channel associated with the first network band.

At 504, the process 500 may include establishing, using a second communication channel associated with a second network band, a second network connection with a second device. For instance, the electronic device 202 may establish the second network connection with the second device. The electronic device 202 may establish the second network connection using the second communication channel associated with the second network band. In some instances, second network band includes a greater frequency than the first network band.

At 506, the process 500 may include receiving, using the first network connection, first data from the first device and at 508, the process 500 may include sending, using the second network connection, the first data to the second device. For instance, the electronic device 202 may receive the first data from the first device using the first network connection. The electronic device 202 may then send, using the second network connection, the first data to the second device.

At 510, the process 500 may include establishing, using a third communication channel associated with the second network band, a third network connection with the first device. For instance, the electronic device 202 may terminate the first network connection with the first device. The electronic device 202 may then establish the third network connection with the first device. In some instances, after establishing the third network connection, the electronic device 202 may be operating in a "temporary" state.

At 512, the process 500 may include establishing, using the third communication channel, a fourth network connection with the second device. For instance, based at least in part on entering the "temporary" state, the electronic device 202 may determine to establish the fourth network connection with the second device using the third communication channel. This may be to reduce latency when relaying data sent from the first device to the second device. As such, the electronic device 202 may terminate the second network connection with the second device. The electronic device 202 may then establish the fourth network connection with the second device.

At 514, the process 500 may include receiving, using the third network connection, second data from the network device and at 516, the process 400 may include sending, using the fourth network connection, the second data to the second device. For instance, the electronic device 202 may receive the second data from the first device using the third network connection. The electronic device 202 may then send, using the fourth network connection, the second data to the second device.

Figure 6:
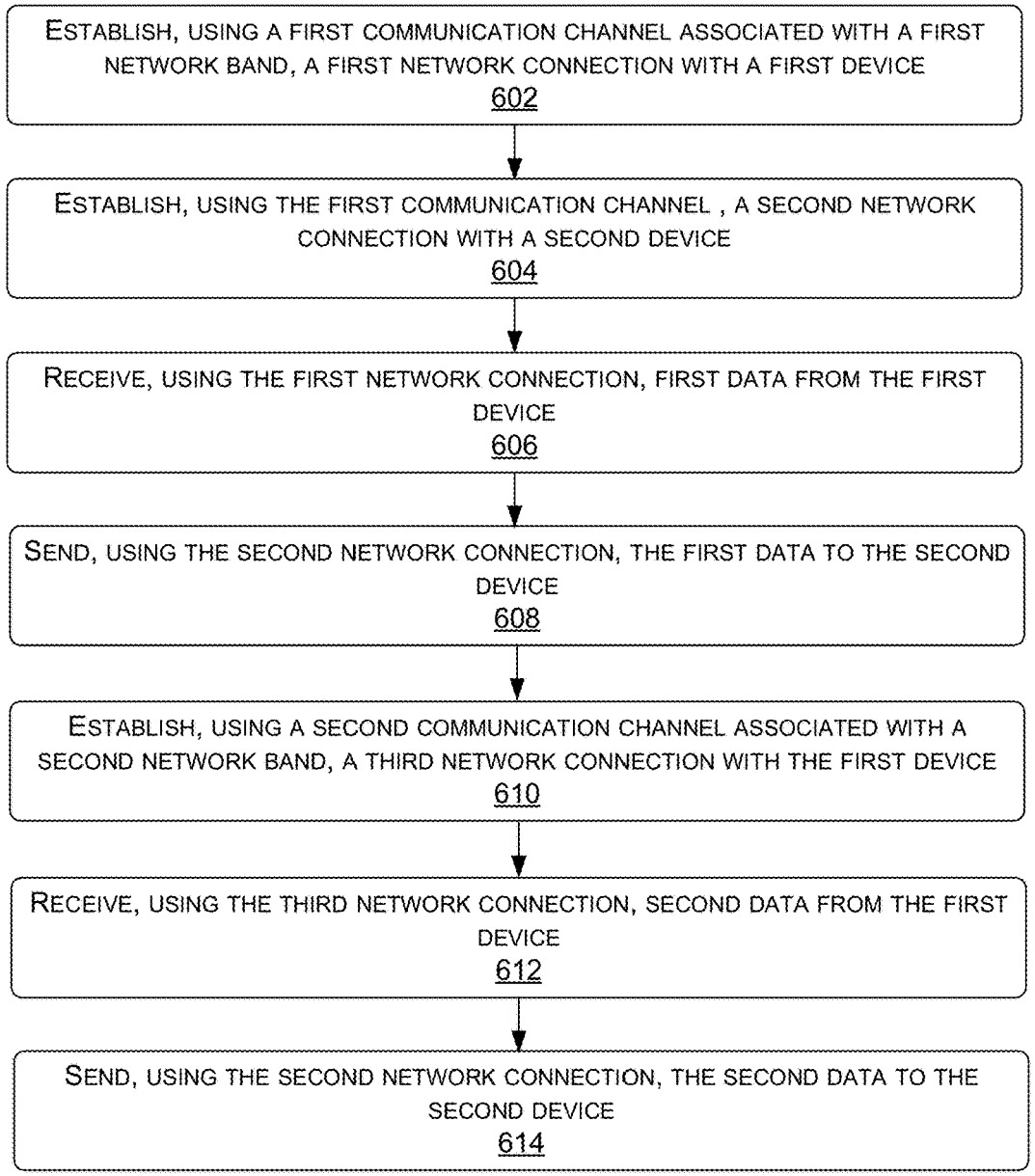
FIG. 6 illustrates a second example process for switching between operational states when a network device switches communication channels, according to various examples of the present disclosure.

FIG. 6 illustrates a second example process 600 for switching between operational states when a network device switches communication channels, according to various examples of the present disclosure. At 602, the process 600 may include establishing, using a first communication channel associated with a first network band, a first network connection with a first device. For instance, the electronic device 202 may establish the first network connection with the first device. The electronic device 202 may establish the first network connection using the first communication channel associated with the first network band.

At 604, the process 600 may include establishing, using the first communication channel, a second network connection with a second device. For instance, based at least in part on determining that the first network connection is on the first network band, the electronic device 202 may determine to establish the second network connection using the first communication channel. The electronic device 202 may then establish the second network connection with the second device using the first communication channel.

At 606, the process 600 may include receiving, using the first network connection, first data from the first device and at 608, the process 600 may include sending, using the second network connection, the first data to the second device. For instance, the electronic device 202 may receive the first data from the first device using the first network connection. The electronic device 202 may then send, using the second network connection, the first data to the second device.

At 610, the process 600 may include establishing, using a second communication channel associated with a second network band, a third network connection with the first device. For instance, the electronic device 202 may terminate the first network connection with the first device. The electronic device 202 may then establish the third network connection with the first device using the second communication channel. In some instances, first network band may include a greater frequency than the second network band.

At 612, the process 600 may include receiving, using the third network connection, second data from the network device and at 614, the process 400 may include sending, using the second network connection, the second data to the second device. For instance, the electronic device 202 may receive the second data from the first device using the third network connection. The electronic device 202 may then send, using the second network connection, the second data to the second device.

Figure 7:
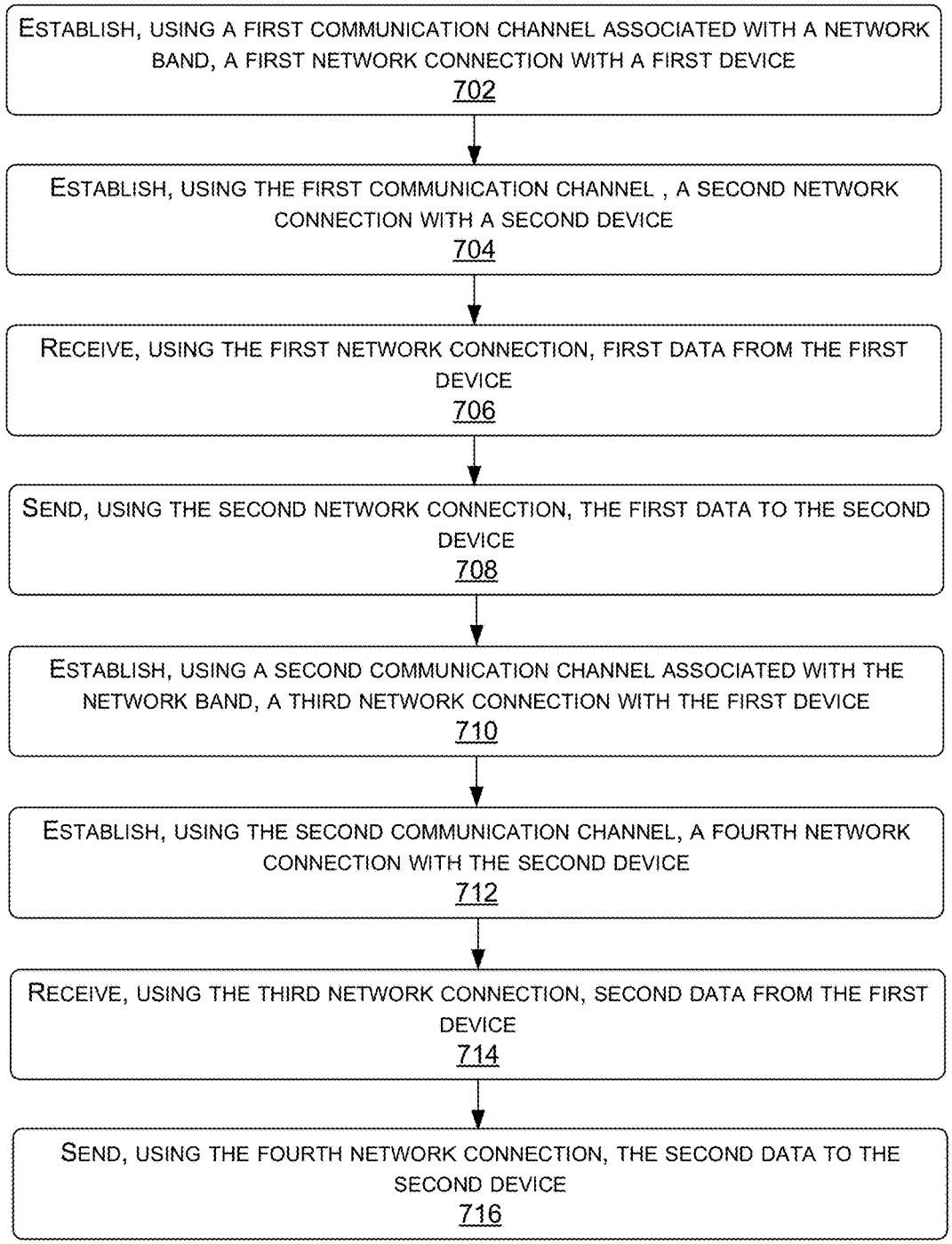
FIG. 7 illustrates an example process for switching communication channels associated with a network band when communicating data, according to various examples of the present disclosure.

FIG. 7 illustrates an example process 700 for switching communication channels associated with a network band when communicating data, according to various examples of the present disclosure. At 702, the process 700 may include establishing, using a first communication channel associated with a network band, a first network connection with a first device and at 704, the process 700 may include establishing, using the first communication channel, a second network connection with a second device. For instance, the electronic device 202 may establish the first network connection with the first device. Based at least in part on a frequency of the network band, the electronic device may then determine to establish the second network connection using the first communication channel. As such, the electronic device 202 may establish the second network connection with the second device using the first communication channel At 706, the process 700 may include receiving, using the first network connection, first data from the first device and at 708, the process 700 may include sending, using the second network connection, the first data to the second device. For instance, the electronic device 202 may receive the first data from the first device using the first network connection. The electronic device 202 may then send, using the second network connection, the first data to the second device.

At 710, the process 700 may include establishing, using a second communication channel associated with the network band, a third network connection with the first device. For instance, the electronic device 202 may terminate the first network connection with the first device. The electronic device 202 may then establish the third network connection with the first device. In some instances, after establishing the third network connection, the electronic device 202 may be operating in a "temporary" state.

At 712, the process 700 may include establishing, using the second communication channel, a fourth network connection with the second device. For instance, based at least in part on entering the "temporary" state, the electronic device 202 may determine to establish the fourth network connection with the second device using the second communication channel. This may be to reduce latency when relaying data sent from the first device to the second device. As such, the electronic device 202 may terminate the second network connection with the second device. The electronic device 202 may then establish the fourth network connection with the second device.

At 714, the process 700 may include receiving, using the third network connection, second data from the network device and at 716, the process 400 may include sending, using the fourth network connection, the second data to the second device. For instance, the electronic device 202 may receive the second data from the first device using the third network connection. The electronic device 202 may then send, using the fourth network connection, the second data to the second device.

Figure 8:
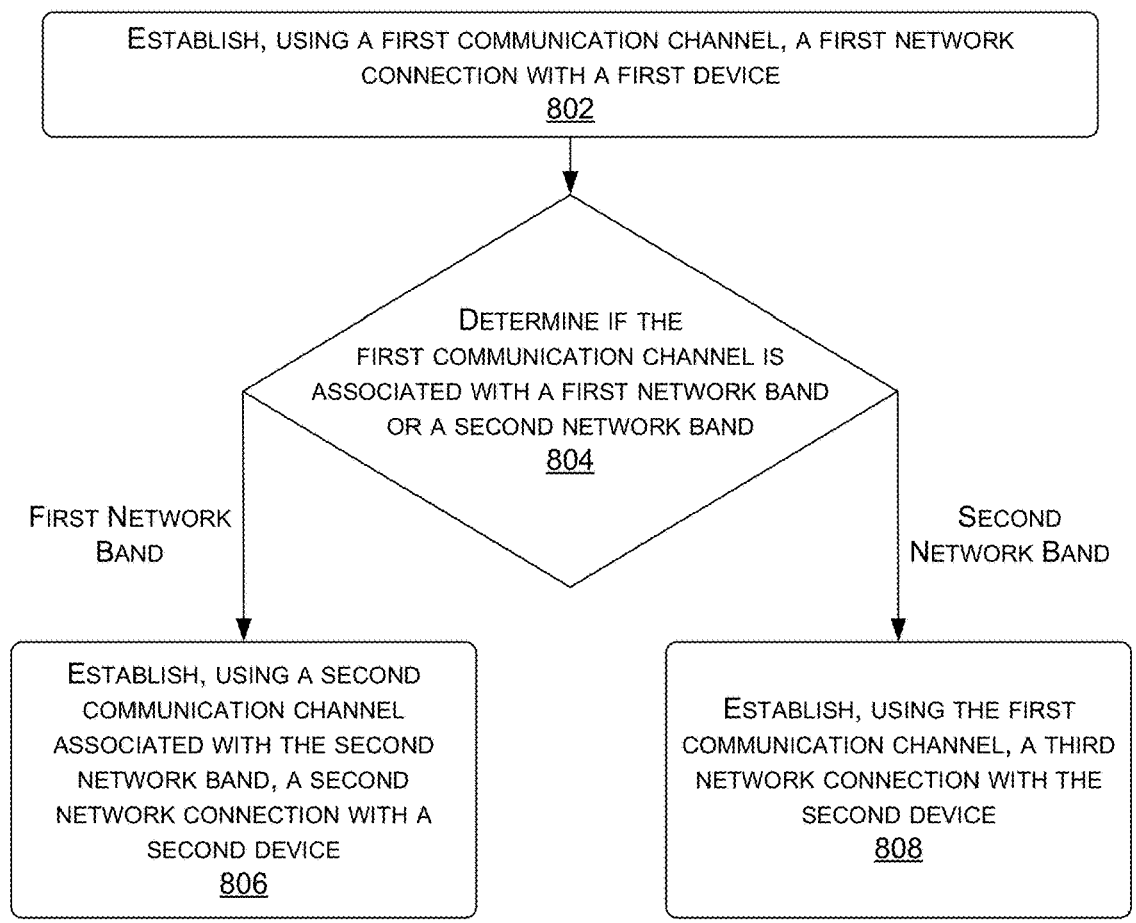
FIG. 8 illustrates an example process for selecting a communication channel when establishing a network connection with a device, according to various examples of the present disclosure.

FIG. 8 illustrates an example process 800 for selecting a communication channel when establishing a network connection with a device, according to various examples of the present disclosure. At 802, the process 800 may include establishing, using a first communication channel, a first network connection with a first device. For instance, the electronic device 202 may establish the first network connection with the first device. The first network connection may be associated with a first network band or a second network band. The second network band may include a greater frequency than the first network band.

At 804, the process 800 may include determining if the first communication channel is associated with a first network band or a second network band. For instance, the electronic device 202 may determine if the first communication channel is associated with the first network band or the second network band.

If, at 804, the electronic device determines that the first communication channel is associated with the first network band, then at 806, the process 800 may include establishing, using a second communication channel associated with the second network band, a second network connection with a second device. For instance, if the electronic device 202 determines that the first communication channel is associated with the first network band, then the electronic device 202 may determine to establish the second network connection using the second communication channel associated with the second network band. The electronic device 202 may then establish the second network connection with the second device using the second communication channel.

However, if, at 804, the electronic device determines that the first communication channel is associated with the second network band, then at 808, the process 800 may include establishing, using the first communication channel, a third network connection with the second device. For instance, if the electronic device 202 determines that the first communication channel is associated with the second network band, then the electronic device 202 may determine to establish the third network connection using the first communication channel. The electronic device 202 may then establish the third network connection with the second device using the third communication channel.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:
1. A method comprising:
   establishing, using a first communication channel, a first network connection with a network device, the first communication channel being associated with a network band;

establishing, using the first communication channel, a
second network connection with an electronic device;
receiving, using the second network connection, data
from the electronic device;
sending, using the first network connection, the data to the
network device;
establishing, using a second communication channel, a
third network connection with the network device, the
second communication channel being associated with
the network band; and
based at least in part on establishing the third network
connection, establishing, using the second communication channel, a fourth network connection with the
electronic device.

2. The method as recited in claim 1, wherein the data is first data, and wherein the method further comprises:
receiving, using the first network connection and from the network device, second data indicating the second communication channel,
and wherein establishing the third network connection with the network device is based at least in part on receiving the second data.

3. The method as recited in claim 1, wherein the network band is a first network band and the data is first data, and wherein the method further comprises:
establishing, using a third communication channel, a fifth network connection with the network device, the third communication channel being associated with a second network band;
receiving, using the fourth network connection, second data from the electronic device; and
sending, using the fifth network connection, the second data to the network device.

4. The method as recited in claim 3, further comprising:
receiving, using the third network connection and from the network device, third data indicating the third communication channel,
and wherein establishing the fifth network connection with the network device is based at least in part on receiving the third data.

5. The method as recited in claim 1, wherein the data is first data, and wherein the method further comprises:
receiving, using the third network connection, second data from the network device; and
sending, using the fourth network connection, the second data to the electronic device.

6. The method as recited in claim 1, further comprising:
establishing, using the first communication channel, a fifth network connection with an additional electronic device; and
based at least in part on establishing the third network connection, establishing, using the second communication channel, a sixth network connection with the additional electronic device.

7. The method as recited in claim 1, wherein establishing the fourth network connection with the electronic device comprises establishing, using the second communication channel, the fourth network connection with the electronic device within a threshold period of time after establishing the third network connection with the network device.

8. The method as recited in claim 1, wherein the data is first data, and wherein the method further comprises:
sending, using the second network connection, second data to the electronic device, the second data indicating the second communication channel,
and wherein establishing the fourth network connection with the electronic device is further based at least in part on the sending the second data.

9. The method as recited in claim 1, wherein the data is first data, and wherein the method further comprises:
receiving, using the second network connection, second data from the electronic device; and
sending, using the third network connection, the second data to the network device,
and wherein a first latency associated with sending the second data to the network device is greater than a second latency associated with sending the first data to the network device.

10. The method as recited in claim 1, wherein the electronic device is a control device and the data is input data associated with a network application, and wherein the method further comprises:
receiving, using the first network connection, video data from the network device, the video data being associated with the network application; and
sending, using a wired connection, the video data to a display device.

11. A first electronic device comprising:
one or more network interfaces;
one or more processors; and
one or more non-transitory computer-readable media storing instructions that, when executed by the one or more processors, cause the one or more processors to perform operations comprising:
establishing, using the one or more network interfaces and over a first communication channel, a first network connection with a network device, the first communication channel being associated with a first network band;
based at least in part on the first communication channel being associated with the first network band, determining to establish a second network connection with a second electronic device using a second communication channel, the second communication channel being associated with a second network band;
establishing, using the one or more network interfaces and over the second communication channel, the second network connection with the second electronic device;
receiving, using the one or more network interfaces and over the second network connection, data from the second electronic device; and
sending, using the one or more network interfaces and over the first network connection, the data to the network device.

12. The first electronic device as recited in claim 11, wherein the second network band includes a lower frequency than the first network band.

13. The first electronic device as recited in claim 11, the operations further comprising:
causing the first electronic device to switch from operating in a first mode to operating in a second mode,
and wherein establishing the first network connection with the network device is based at least in part in the operating in the second mode.

14. The first electronic device as recited in claim 11, the operations further comprising:
establishing, using the one or more network interfaces and over a third communication channel, a third network connection with the network device, the third communication channel being associated with the second network band; and based at least in part on establishing the third network connection, establishing, using the third communication channel, a fourth network connection with the second electronic device.

15. The first electronic device as recited in claim 14, wherein the data is first data, and wherein the operations further comprise:

establishing, using the one or more network interfaces and over a fourth communication channel, a fifth network connection with the network device, the fourth communication channel being associated with the first network band;

receiving, using the one or more network interfaces and over the fourth network connection, second data from the second electronic device; and sending, using the one or more network interfaces and over the fifth network connection, the second data to the network device.

16. The first electronic device as recited in claim 11, wherein establishing the second network connection with the second electronic device comprises establishing, using the one or more network interfaces and over the second communication channel, the second network connection with the second electronic device within a threshold period of time after establishing the first network connection with the network device.

17. A first electronic device comprising:
one or more network interfaces;
one or more processors; and
one or more non-transitory computer-readable media storing instructions that, when executed by the one or more processors, cause the one or more processors to perform operations comprising:

establishing, using the one or more network interfaces and over a communication channel, a first network connection with a network device, the communication channel being associated with a network band;

based at least in part on the communication channel being associated with the network band, determining to establish a second network connection with a second electronic device using the communication channel;

establishing, using the one or more network interfaces and over the communication channel, the second network connection with the second electronic device;

receiving, using the one or more network interfaces and over the second network connection, data from the second electronic device; and sending, using the one or more network interfaces and over the first network connection, the data to the network device.

18. The first electronic device as recited in claim 17, wherein the communication channel is a first communication channel, and wherein the operations further comprise:

establishing, using the one or more network interfaces and over a second communication channel, a third network connection with the network device, the second communication channel being associated with the network band; and based at least in part on establishing the third network connection, establishing, using the one or more network interfaces and over the second communication channel, a fourth network connection with the second electronic device.

19. The first electronic device as recited in claim 17, wherein the communication channel is a first communication channel, the network band is a first network band, and the data is first data, and wherein the operations further comprise:

establishing, using the one or more network interfaces and over a second communication channel, a third network connection with the network device, the second communication channel being associated with a second network band;

receiving, using the one or more network interfaces and over the second network connection, second data from the second electronic device; and sending, using the one or more network interfaces and over the third network connection, the second data to the network device.

20. The first electronic device as recited in claim 17, wherein the data is input data, and wherein the operations further comprise:

receiving, using the one or more network interfaces and over the first network connection, video data to the network device; and sending the video data to a third electronic device.

* * * * *